United States Patent
Sun et al.

(10) Patent No.: US 9,497,976 B2
(45) Date of Patent: Nov. 22, 2016

(54) METHOD FOR IMPROVING, BY USING POWER-VARIABLE ULTRASONIC WAVES, FROZEN FISH FILLETS TREATED BY MEANS OF SALT-WATER IMMERSION PROCESS

(71) Applicant: SOUTH CHINA UNIVERSITY OF TECHNOLOGY, Guangzhou, Guangdong Province (CN)

(72) Inventors: Dawen Sun, Guangzhou (CN); Fen Hu, Guangzhou (CN); Xin'an Zeng, Guangzhou (CN); Qijun Wang, Guangzhou (CN); Wenhong Gao, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 14/780,861

(22) PCT Filed: Dec. 20, 2013

(86) PCT No.: PCT/CN2013/090061
§ 371 (c)(1),
(2) Date: Sep. 28, 2015

(87) PCT Pub. No.: WO2014/153994
PCT Pub. Date: Oct. 2, 2014

(65) Prior Publication Data
US 2016/0050945 A1 Feb. 25, 2016

(30) Foreign Application Priority Data
Mar. 26, 2013 (CN) .......................... 2013 1 0100237

(51) Int. Cl.
| | | |
|---|---|---|
| A23B 4/09 | (2006.01) | |
| A23B 4/015 | (2006.01) | |
| A22C 25/18 | (2006.01) | |
| A22C 25/02 | (2006.01) | |
| A22C 25/20 | (2006.01) | |
| A22C 25/14 | (2006.01) | |
| A22C 25/17 | (2006.01) | |
| A22C 25/16 | (2006.01) | |
| A23L 1/025 | (2006.01) | |
| A23L 1/36 | (2006.01) | |
| A23L 3/375 | (2006.01) | |
| A23B 4/06 | (2006.01) | |
| A23L 3/30 | (2006.01) | |
| A23B 4/023 | (2006.01) | |
| A23L 1/325 | (2006.01) | |

(52) U.S. Cl.
CPC ............... *A23B 4/015* (2013.01); *A22C 25/02* (2013.01); *A22C 25/142* (2013.01); *A22C 25/145* (2013.01); *A22C 25/16* (2013.01); *A22C 25/17* (2013.01); *A22C 25/18* (2013.01); *A22C 25/20* (2013.01); *A23B 4/023* (2013.01); *A23B 4/06* (2013.01); *A23B 4/09* (2013.01); *A23L 1/0252* (2013.01); *A23L 1/325* (2013.01); *A23L 1/36* (2013.01); *A23L 3/30* (2013.01); *A23L 3/375* (2013.01); *A23V 2002/00* (2013.01)

(58) Field of Classification Search
CPC .................. A22C 25/02; A22C 25/14–25/18; A22C 25/20; A23B 4/002; A23B 4/015; A23B 4/06–4/09; A23B 4/023; A23L 1/0073; A23L 1/0252; A23L 1/325–1/333; A23L 3/30; A23L 3/36–3/375
USPC .......................................... 426/238, 524, 643
See application file for complete search history.

(56) References Cited

U.S. PATENT DOCUMENTS

| | | | | |
|---|---|---|---|---|
| 1,404,352 | A * | 1/1922 | Eaton ....................... | A23B 4/08 426/479 |
| 2,766,598 | A * | 10/1956 | Amiot .................... | A23B 4/066 62/240 |
| 4,309,449 | A * | 1/1982 | O'Roark ................ | A22C 29/02 426/308 |
| 4,353,928 | A * | 10/1982 | Seliger ................... | A23B 4/015 426/238 |
| 5,797,271 | A * | 8/1998 | Darigo ................... | A23B 4/062 62/239 |
| 6,004,607 | A * | 12/1999 | Brackebusch ........... | A23B 4/09 426/327 |
| 2005/0031770 | A1* | 2/2005 | Knauf .................... | A22B 3/083 426/643 |
| 2008/0305222 | A1* | 12/2008 | Takenaka ................ | A23L 1/025 426/238 |

(Continued)

FOREIGN PATENT DOCUMENTS

| | | |
|---|---|---|
| CN | 1399921 A | 3/2003 |
| CN | 1408284 A | 4/2003 |
| CN | 1439316 A | 9/2003 |
| CN | 101803759 A | 8/2010 |

(Continued)

OTHER PUBLICATIONS

Mar. 20, 2014 International Search Report issued in International Patent Application No. PCT/CN2013/090061.

*Primary Examiner* — Drew Becker
(74) *Attorney, Agent, or Firm* — Oliff PLC

(57) ABSTRACT

A method for improving frozen fish fillets treated by way of a salt-water immersion process includes the following steps: pretreating raw fish to obtain fish fillets; precooling the fish fillets; stacking the precooled fish fillets to obtain a fish fillet stack; freezing the fish fillet stack by using a salt-water immersion process, and performing power-variable ultrasonic wave treatment; and feeding the fish fillets into a cold storage, and performing freezing storage at minus 18 degrees centigrade. The power-variable ultrasonic wave treatment includes: firstly treating for 5 to 10 min under the power of 800 to 600 W, and then changing the power to 200 to 600 W for treating for 5 to 15 min. The freezing time of fish flesh is shortened, and formed ice crystals are fine and uniform, thereby preventing the damage of the formed ice crystals to cell walls.

4 Claims, No Drawings

(56) References Cited

U.S. PATENT DOCUMENTS

2009/0007586 A1* 1/2009 Takenaka .................. A23L 3/28
 62/374
2010/0209568 A1* 8/2010 Brown ..................... A23B 4/00
 426/238

FOREIGN PATENT DOCUMENTS

| CN | 101919433 A | 12/2010 |
|---|---|---|
| CN | 101919539 A | 12/2010 |
| CN | 101822284 B | 12/2012 |
| CN | 103168826 A | 6/2013 |

* cited by examiner

METHOD FOR IMPROVING, BY USING POWER-VARIABLE ULTRASONIC WAVES, FROZEN FISH FILLETS TREATED BY MEANS OF SALT-WATER IMMERSION PROCESS

FIELD OF THE INVENTION

The present invention relates to the field of frozen food technology, especially to a method for improving, by using power-variable ultrasonic waves, frozen fish fillets treated by means of a salt-water immersion process.

BACKGROUND OF THE INVENTION

Ultrasonic technology, used in the freezing industry, is a good way to effectively improve the quality of frozen products. Physical effects (cavitation effect) of ultrasonic waves can reduce the degree of supercooling needed by ice crystal nucleation to promote the formation of crystal nuclei, especially in an environment with a low degree of supercooling that is difficult for nucleation, where the use of ultrasonic waves can effectively promote nucleation. The ultrasonic waves can break larger ice crystals as well. The bubbles produced by the higher-intensity ultrasonic waves can also act as crystal nuclei effectively, thereby increasing the number of ice crystals, thus reducing the volume of ice crystals. Besides, the phenomenon of strong agitation and micro gasification produced by the ultrasonic cavitation effect can increase the mass and heat transfer coefficient of frozen food, thus achieving the purpose of rapid freezing.

The ultrasonic cavitation effect is influenced by many factors, such as frequency and intensity of the ultrasonic waves, and nature of the object subject to the ultrasonic waves. The ultrasonic waves act on a liquid and causes sonic propagation therein. When the intensity is high enough, there will be a lot of mobile bubbles in the liquid, which are classified into ordinary bubbles and cavitation bubbles in accordance with their vibration behavior. The cavitation bubbles show strong nonlinear effects in the process of movement, and can cause the sonic energy to be converted to other forms of energy. With the increase of the ultrasonic frequency, the cavitation bubbles overall show a decline trend in vibration, and therefore the cavitation effect is correspondingly weakened with the increasing frequency. While with the sonic frequency unchanged, smaller micro bubbles can be converted to the cavitation bubbles within a certain range by increasing the sonic intensity, thereby improving the cavitation effect of the ultrasonic waves.

Da-Wen Sun and Bing Li treated potatoes immersed in the freezing fluid for 2 min in 2002 with ultrasonic waves at a power of 15.85 W and a frequency of 25 kHz, and then observed the potatoes under a scanning electron microscope, finding that the potatoes had intact cell membrane structure and small intercellular space. X. Zhang et al., taking water containing saturated bubbles as an ultrasonic object in the same year, observed that there might be another principle of a tiny stream for the promotion of crystallization by ultrasonic waves, which did not exist in a solid sample, however. Cheng-Hui Wang and Shu-Yu Lin made study on the non-linear vibration of bubbles under the action of ultrasonic waves in 2010, with the result that the cavitation effect of ultrasonic waves was related to many factors. Hossein Kiani and Da-Wen Sun et al. treated agar gel as a food model with different irradiation time and ultrasonic intensity in 2011, proving that ultrasonic waves could reduce the degree of supercooling needed by crystallization and shorten the freezing time.

Unlike plants, fish may be subject to changes peculiar to animals after being captured or slaughtered. First, the enzyme system of their own starts to work; in glycolysis, glycogen is decomposed into lactic acid, resulting in lower pH. Then, pH drops below a certain level to cause adenosine triphosphatase to start to work; adenosine triphosphate becomes less by being decomposed, and phosphocreatine will also become less until disappear, and then mytolin contracts, which may cause rigor mortis; rigor mortis makes muscles contract, with elasticity and extensibility reduced; on the occasion of fish being caught, the fish will be suffocated if it is in a fishing net, and then glycogen will be decomposed into lactic acid with adenosine triphosphate almost exhausted, here without causing rigor mortis but direct corruption instead. Next, rigor mortis will end before long, with the original hardness restored. Further next, the enzyme in muscles digests itself, thus increasing soluble substances and softening tissue. Finally, with self-digestion increasing the soluble substances, adhering and invading bacteria will proliferate vigorously to cause the decomposed products to accumulate, making the fish flesh corrupted soon.

The patent CN201010130687.2 discloses a method that, by adding a composite antifreezer, can reduce freezing denaturation of the frozen minced fish protein more effectively, and improve gel strength of frozen minced fish. The patent CN201010156877.1 discloses that algin decomposition products, as a phosphorus-free quality-improving agent, can significantly improve quality of fish fillets, and can significantly reduce the product thawing loss and improve the product tenderness, thereby significantly improving the texture of frozen fish fillets. The patent CNO3105265.7 discloses that Chinese medicinal herb and food can be quickly frozen and freshly kept, and ice crystals can be sublimated under freezing conditions, avoiding the phenomenon that substances are oxidized and decomposed due to high-temperature atmospheric evaporation, thus keeping the original specific nutrients and high active ingredient content. The patent CN01135334.1 discloses a food freezing system that adds an electric field to a cooling medium. The patent CN01124944.7 discloses that barrier ice is integrated with thermal insulation materials, thereby increasing the thermal insulation thickness to freeze beet, making the overall input adapted to the output.

With the development of freshwater aquaculture, freshwater fish output increases rapidly. In addition to marketing fresh, it has become one of the methods widely used in the aquatic product processing industry to process the freshwater fish into fish fillets, fish segments and fish steaks, and to freeze them into a small package of frozen food, which has also alleviated the situation of "difficulty in selling" freshwater fish to a certain degree. The cold storage methods include an ice filling process by sprinkling fish with crushed ice, and an ice water cooling process by putting fish into ice water, which have their own characteristics, but cannot generally be used for long-term preservation of fish. Therefore, quick freezing is needed, with the freezing methods generally including a salt-water immersion process (immersing and freezing fish in salt water at about −5° C.), a contact process (freezing fish on a cryopanel at −40° C. to −25° C.), and a half-blasting process (feeding a cold blast at −40° C. to −35° C. at a speed of 3 to 5 m/s for freezing). The freezing storage temperature for freezing fish is preferably as low as possible, especially for a long preservation, but it is typically −20° C. for the economic reasons.

When the fish flesh is stored by being frozen, the water therein is converted from a liquid phase into a solid phase to form ice crystals, which are distributed intracellularly and intercellularly in the fish tissue. The deficiency of the prior art is that, under general freezing conditions, the formed ice crystals tend to be larger than the diameter of fish flesh cells, such that the ice crystals cause physical damage to the cell walls, resulting in protoplasm spillover and cell deformation, and thus the fish flesh loses its original texture, causing a severe nutritional flavor loss after the fish flesh is thawed. Treating the fish flesh with the constant-power ultrasonic waves, due to the different ice crystal growth micro-environment for different parts of the fish flesh, is difficult to achieve a uniform treatment effect.

CONTENTS OF THE INVENTION

In order to overcome the above shortcomings and deficiencies of the prior art, a purpose of the present invention is to provide a method for improving, by using power-variable ultrasonic waves, frozen fish fillets treated by means of a salt-water immersion process, so as to shorten the time for freezing the fish flesh, make the formed ice crystals fine and uniform, prevent the formed ice crystals from damaging the cell walls, and further reduce freezing denaturation and nutrition loss of the fish flesh.

The purpose of the present invention is achieved by the following technical solution:

A method for improving, by using power-variable ultrasonic waves, frozen fish fillets treated by means of a salt-water immersion process is provided, comprising the following steps:

(1) pretreating raw fish to obtain fish fillets;
(2) precooling the fish fillets;
(3) stacking the precooled fish fillets to obtain a fish fillet stack;
(4) freezing the fish fillet stack by using a salt-water immersion process, and performing power-variable ultrasonic wave treatment; and
(5) feeding the fish fillets into freezing storage.

Said Step (4), freezing the fish fillet stack by using a salt-water immersion process and performing power-variable ultrasonic wave treatment, is specifically as follows:

Immersing the fish fillet stack in a sodium chloride solution at −18° C. to −20° C., and performing the power-variable ultrasonic wave treatment; the concentration of the sodium chloride solution is 25% to 30% (m/m); the power-variable ultrasonic wave treatment specifically comprises: under an ultrasonic wave frequency condition of 20 kHz, firstly treating for 5 to 10 min under the power of 800 to 600 W, and then changing the power to 200 to 600 W for treating for 5 to 15 min.

Said Step (1), pretreating raw fish to obtain fish fillets, is specifically as follows:

After the frozen raw fish is slaughtered, decapitated and gutted, removing the mucus and impurities on the surface of the fish body and the intraperitoneal staining blood with running water, removing spine and skin, cutting the fish into pieces, and shaping them to obtain fish fillets having a thickness of 1 to 3 cm, a width of 2 to 4 cm, and a length of 3 to 5 cm.

Said Step (2), precooling the fish fillets, is specifically as follows: precooling the fish fillets to 0° C. to 1° C.

Said Step (3), stacking the precooled fish fillets to obtain a fish fillet stack, is specifically as follows:

Stacking the precooled fish fillets regularly into fish fillet stacks having a height of 20 to 30 cm, a width of 10 to 15 cm and a length of 12 to 15 cm, and putting them into a freezing tank at an interval of 5 to 8 cm.

With respect to the prior art, the present invention has the following advantages or beneficial effects:

(1) Being faster in freezing fish fillets: compared to a salt-water immersion freezing process without using ultrasonic waves, the freezing time can be shortened by nearly 20% ($P<0.05$).

(2) Fish juice loss after thawing the frozen fish fillets is greatly reduced: treating the fish flesh by using power-variable ultrasonic waves can be more uniform in treating different ice crystal growth micro-environment of different parts of the fish flesh; therefore, compared to the sample treated with the constant-power ultrasonic waves, the fish juice loss after the microwave thawing can be reduced by 30%.

(3) Compared to a sample not treated with ultrasonic waves, the salt-soluble protein loss of the frozen fish fillets is significantly reduced by nearly 20%.

DETAILED DESCRIPTION OF THE EMBODIMENTS

The present invention will be further described below in detail with reference to examples; however, the embodiments of the present invention are not limited thereto.

Example 1

After getting fresh salmon slaughtered, decapitated and gutted, removing the mucus and impurities on the surface of the fish body and the intraperitoneal staining blood with running water, removing spine and skin, cutting the fish into pieces, shaping them to obtain fish fillets of 3×2×3 cm (thickness×width×length), taking 5 kg by weighing, and precooling to 0° C. Stacking the precooled salmon fillets into fish fillet stacks having a height of 20 cm, a width of 15 cm and a length of 15 cm, and putting them into a freezing tank at an interval of 5 cm. The freezing fluid is 30% (m/m) salt water, and the liquid ratio is 1:100. After 5 min, using ultrasonic waves to treat the salmon fillets until they are cooled to −18° C., and then taking them out frozen and rapidly wrapping them with a preservative film before frozen pack storage at −18° C. The power-variable ultrasonic wave treatment specifically comprises: treating under the conditions of a frequency of 20 kHz and a power of 800 W for 10 min, and then, at the same frequency, converting the power to 400 W and treating for 5 min. The fish fillet freezing time (the time needed for cooling down from 0° C. to −18° C.), compared to the salmon fillets without the ultrasonic wave treatment, is shortened by 13% ($P<0.05$). The juice loss of the frozen salmon slices after the microwave thawing, compared to the salmon slices treated with the constant-power ultrasonic waves, is reduced by 23%, with the salt-soluble protein loss thereof reduced by 15% compared to the salmon fillets without the ultrasonic treatment.

Example 2

After getting fresh groupers slaughtered, decapitated and gutted, removing the mucus and impurities on the surface of the fish body and the intraperitoneal staining blood with running water, removing spine and skin, cutting the fish into pieces, shaping them to obtain fish fillets of 1×4×5 cm (thickness×width×length), taking 6 kg by weighing, and precooling to 1° C. Stacking the precooled grouper fillets into fish fillet stacks having a height of 30 cm, a width of 10 cm and a length of 15 cm, and putting them into a freezing tank at an interval of 8 cm. The freezing fluid is 25% (m/m) salt water, and the liquid ratio is 1:100. After 5 min, using ultrasonic waves to treat the grouper fillets until they are cooled to −20° C., and then taking them out frozen and rapidly wrapping them with a preservative film before frozen pack storage at −18° C. The power-variable ultrasonic wave treatment specifically comprises: treating under the conditions of a frequency of 20 kHz and a power of 600 W for 5 min, and then, at the same frequency, converting the power to 200 W and treating for 15 min. The fish fillet freezing time (the time needed for cooling down from 0° C. to −18° C.), compared to the grouper fillets without the ultrasonic wave treatment, is shortened by 13% ($P<0.05$). The juice loss of the frozen grouper slices after the microwave thawing, compared to the grouper slices treated with the constant-power ultrasonic waves, is reduced by 20%, with the salt-soluble protein loss thereof reduced by 18% compared to the grouper fillets without the ultrasonic treatment.

Example 3

After getting fresh codfishes slaughtered, decapitated and gutted, removing the mucus and impurities on the surface of the fish body and the intraperitoneal staining blood with running water, removing spine and skin, cutting the fish into pieces, shaping them to obtain fish fillets of 2×4×4 cm (thickness×width×length), taking 4 kg by weighing, and precooling to 0° C. Stacking the precooled codfish fillets into fish fillet stacks having a height of 25 cm, a width of 10 cm and a length of 12 cm, and putting them into a freezing tank at an interval of 5 cm. The freezing fluid is 25% (m/m) salt water, and the liquid ratio is 1:100. After 5 min, using ultrasonic waves to treat the codfish fillets until they are cooled to −18° C., and then taking them out frozen and rapidly wrapping them with a preservative film before frozen pack storage at −18° C. The power-variable ultrasonic wave treatment specifically comprises: treating under the conditions of a frequency of 20 kHz and a power of 700 W for 10 min, and then, at the same frequency, converting the power to 580 W and treating for 5 min. The fish fillet freezing time (the time needed for cooling down from 0° C. to −18° C.), compared to the codfish fillets without the ultrasonic wave treatment, is shortened by 15% ($P<0.05$). The juice loss of the frozen codfish slices after the microwave thawing, compared to the codfish slices treated with the constant-power ultrasonic waves, is reduced by 18%, with the salt-soluble protein loss thereof reduced by 20% compared to the codfish fillets without the ultrasonic treatment.

The above examples are preferred embodiments of the present invention. However, the embodiments of the present invention are free from restriction of the examples, and any other modification, amendment, replacement, combination and simplification not departing from the spirit and principle of the present invention shall be the equivalent permutation method, and all fall within the scope of protection of the present invention.

What is claimed is:

1. A method for improving, by using power-variable ultrasonic waves, frozen fish fillets treated by means of a salt-water immersion process comprises the following steps:
   (1) pretreating raw fish to obtain fish fillets;
   (2) precooling the fish fillets;
   (3) stacking the precooled fish fillets to obtain a fish fillet stack;
   (4) freezing the fish fillet stack by using a salt-water immersion process, and performing power-variable ultrasonic wave treatment, which is specifically as follows:
   immersing the fish fillet stack in a sodium chloride solution at −18° C. to −20° C., and performing power-variable ultrasonic wave treatment; the concentration of the sodium chloride solution is 25 to 30% (m/m); the power-variable ultrasonic wave treatment specifically comprises: under an ultrasonic wave frequency condition of 20 kHz, firstly treating for 5 to 10 min under the power of 800 to 600 W, and then changing the power to 200 to 600 W for treating for 5 to 15 min; and
   (5) feeding the fish fillets into freezing storage.

2. The method for improving, by using power-variable ultrasonic waves, frozen fish fillets treated by means of a salt-water immersion process according to claim 1, wherein: said Step (1), pretreating raw fish to obtain fish fillets, is specifically as follows:
   after the frozen raw fish is slaughtered, decapitated and gutted, removing the mucus and impurities on the surface of the fish body and the intraperitoneal staining blood with running water, removing spine and skin, cutting the fish into pieces, and shaping them to obtain fish fillets having a thickness of 1 to 3 cm, a width of 2 to 4 cm, and a length of 3 to 5 cm.

3. The method for improving, by using power-variable ultrasonic waves, frozen fish fillets treated by means of a salt-water immersion process according to claim 1, wherein: said Step (2), precooling the fish fillets, is specifically as follows: precooling the fish fillets to 0° C. to 1° C.

4. The method for improving, by using power-variable ultrasonic waves, frozen fish fillets treated by means of a salt-water immersion process according to claim 1, wherein: said Step (3), stacking the precooled fish fillets to obtain a fish fillet stack, is specifically as follows:
   stacking the precooled fish fillets regularly into a fish fillet stack having a height of 20 to 30 cm, a width of 10 to 15 cm and a length of 12 to 15 cm, and putting them into a freezing tank at an interval of 5 to 8 cm.

* * * * *